United States Patent [19]
Lee

[11] Patent Number: 6,020,933
[45] Date of Patent: Feb. 1, 2000

[54] METHOD AND APPARATUS FOR ENCODING A MOTION VECTOR

[75] Inventor: Sang-Hoon Lee, Seoul, Rep. of Korea

[73] Assignee: Daewoo Electronics Co., Ltd., Rep. of Korea

[21] Appl. No.: 08/958,652

[22] Filed: Oct. 27, 1997

[30] Foreign Application Priority Data

Sep. 30, 1997 [KR] Rep. of Korea ............. 97-49949

[51] Int. Cl.$^7$ ................. G06T 7/20; H04N 7/36
[52] U.S. Cl. ............................................... 348/699
[58] Field of Search .................. 348/699, 402, 348/407, 413, 416; H04N 7/36

[56] References Cited

U.S. PATENT DOCUMENTS

| 5,371,539 | 12/1994 | Okino ............ 348/699 |
| 5,398,078 | 3/1995 | Masuda ........... 348/699 |
| 5,479,212 | 12/1995 | Kurobe ........... 348/416 |
| 5,610,658 | 3/1997 | Uchida ........... 348/699 |
| 5,802,211 | 9/1998 | King ............. 348/699 |

FOREIGN PATENT DOCUMENTS

0466981  1/1992  European Pat. Off. ......... H04N 7/13

*Primary Examiner*—Howard Britton
*Attorney, Agent, or Firm*—Anderson Kill & Olick

[57] ABSTRACT

A current motion vector CMV of a search block is encoded based on a plurality of reference motion vectors RMV's. A first and a second candidate predictors FCP and SCP having first components FCP_1 and SCP_1 and second components FCP_2 and SCP_2 are determined. The FCP_1 and the FCP_2 represent medians of the first and the second components RMV_1's and RMV_2's of the RMV's, respectively, while the SCP_1 and the SCP_2 represent a RMV_1 and a RMV_2 which yield a least first and a second absolute differences with respect to a first and a second components CMV_1 and CMV_2 of the CMV, respectively. A dispersion value of the RMV's is compared with a predetermined threshold to thereby generate a first selection signal if the dispersion value is less than the threshold and a second selection signal if otherwise. A third candidate predictor TCP having a first and a second components TCP_1 and TCP_2 is determined based on the number of encoded bits generated by encoding the CMV_1 with respect to each of the FCP_1 and the SCP_1 and the number of encoded bits generated by encoding the CMV_2 with respect to each of the FCP_2 and the SCP_2, wherein the TCP_1 is one of the FCP_1 and the SCP_1 and the TCP_2 is either the FCP_2 or the SCP_2. The CMV is encoded based on the FCP and the TCP in response to the first and the second selection signals, respectively, thereby generating encoded motion vector data for the CMV.

20 Claims, 4 Drawing Sheets

METHOD AND APPARATUS FOR ENCODING A MOTION VECTOR

FIELD OF THE INVENTION

The present invention relates to a method and apparatus for encoding a motion vector; and, more particularly, to a method and apparatus capable of encoding a motion vector of a search block with an improved coding efficiency.

DESCRIPTION OF THE PRIOR ART

In digitally televised systems such as video-telephone, teleconference and high definition television systems, a large amount of digital data is needed to define each video frame signal since a video line signal in the video frame signal comprises a sequence of digital data referred to as pixel values. Since, however, the available frequency bandwidth of a conventional transmission channel is limited, in order to transmit the large amount of digital data therethrough, it is necessary to compress or reduce the volume of data through the use of various data compression techniques, especially in the case of such low bit-rate video signal encoders as video-telephone and teleconference systems.

Among various video compression techniques, the so-called hybrid coding technique, which combines temporal and spatial compression techniques together with a statistical coding technique, is known to be most effective.

Most hybrid coding techniques employ a motion compensated DPCM(Differential Pulse Coded Modulation), two-dimensional DCT(Discrete Cosine Transform), quantization of DCT coefficients, and VLC(Variable Length Coding). The motion compensated DPCM is a process of estimating the movement of an object between a current frame and its previous frame, and predicting the current frame according to the motion flow of the object to produce a differential signal representing the difference between the current frame and its prediction.

Specifically, in the motion compensated DPCM, current frame data is predicted from the corresponding previous frame data based on an estimation of the motion between the current and the previous frames. Such estimated motion may be described in terms of two dimensional motion vectors representing the displacements of pixels between the previous and the current frames.

There have been two basic approaches to estimate the displacements of pixels of an object. Generally, they can be classified into two types: one is a block-by-block estimation and the other is a pixel-by-pixel approach.

In the pixel-by-pixel approach, the displacement is determined for each and every pixel. This technique allows a more exact estimation of the pixel value and has the ability to easily handle scale changes and non-translational movements of the object.

However, in the pixel-by-pixel approach, it is virtually impossible to transmit all of the motion vectors to a receiver since a motion vector is determined at each and every pixel.

Using the block-by-block motion estimation, on the other hand, a current frame is divided into a plurality of search blocks. To determine a motion vector for a search block of the current frame, a similarity calculation is performed between the search block of the current frame and each of a plurality of equal-sized candidate blocks included in a generally larger search region within the previous frame. An error function such as the mean absolute error or mean square error is used to carry out the similarity measurement between the search block of the current frame and one of the candidate blocks in the search region of the previous frame. And the motion vector, by definition, represents the displacement between the search block and the candidate block which yields a minimum error function.

Figure 1:
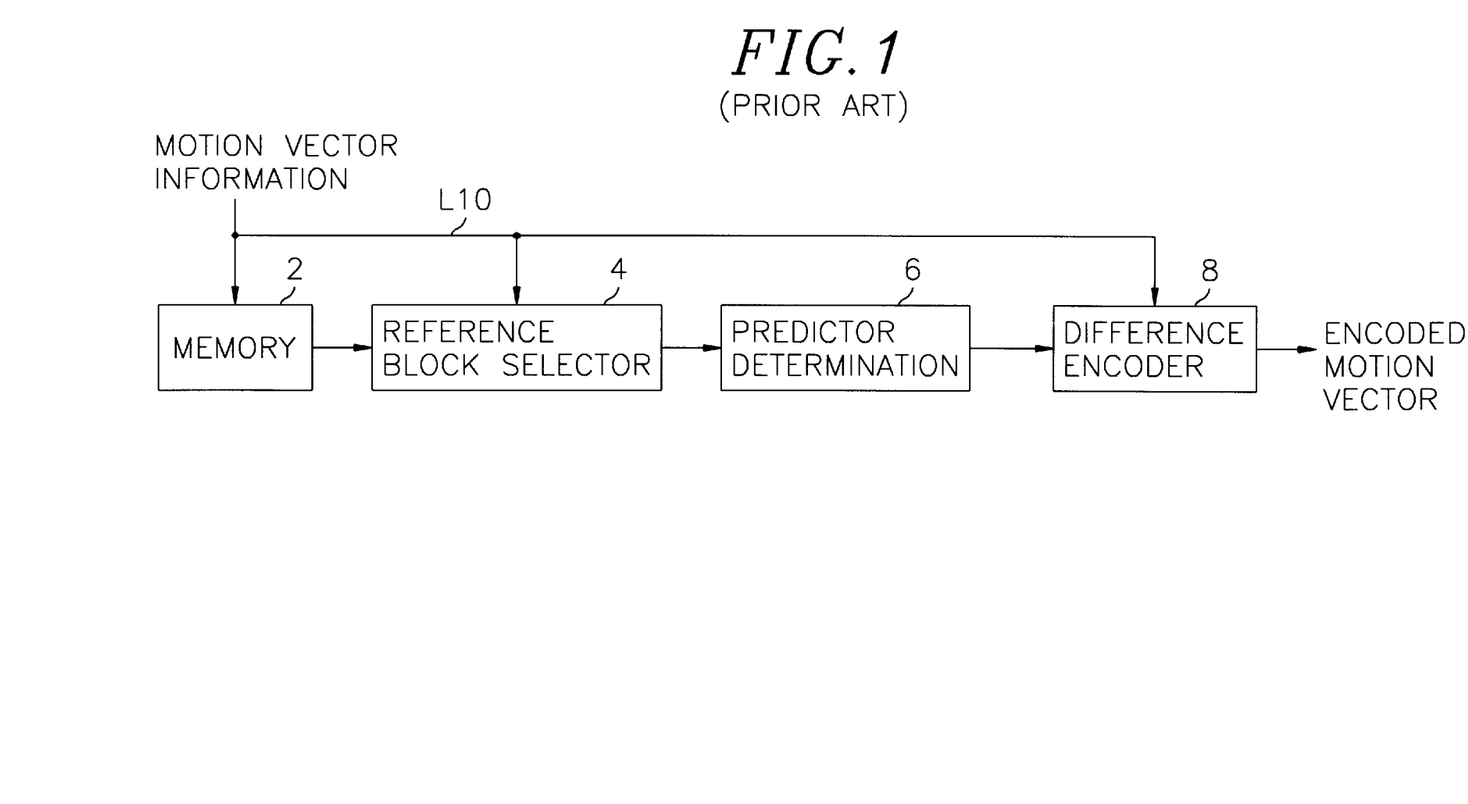
FIG. 1 shows a schematic block diagram of a conventional apparatus for encoding a motion vector of a search block by median filtering reference motion vectors.

Referring to FIG. 1, there is shown a schematic block diagram of a conventional apparatus for encoding a motion vector of a search block based on directional median values of the motion vectors of neighboring search blocks.

Motion vector information for each search block of the current frame is sequentially inputted to a memory 2, a reference block selector 4 and a difference encoder 8 via a line L10, wherein the motion vector information on a search block includes position data of the search block within the current frame and a motion vector of the search block, the motion vector being represented by a horizontal and a vertical components thereof. The memory 2 stores the motion vectors by using the position data thereof as addresses.

The reference block selector 4 determines reference search blocks of a current search block based on the position data thereof and retrieves motion vectors of the reference search blocks from the memory 2, the reference search blocks having a predetermined positional relationship to the current search block. For instance, as disclosed in MPEG (Moving Pictures Expert Group)-4, Video Verification Model Version 7.0, ISO/IEC JTC1/SC29/WG11, MPEG97/ 1642, three blocks positioned at the left, upper, upper-right of the current search block can be determined as the reference search blocks. The motion vectors of the reference search blocks are provided to a predictor determination block 6 as the reference motion vectors for the motion vector of the current search block("current motion vector").

In response to the reference motion vectors, the predictor determination block 6 determines a predictor of the current motion vector and provides same to the difference encoder 8, wherein a horizontal and a vertical components of the predictor are medians of horizontal and vertical components of the reference motion vectors, respectively.

The difference encoder 8 finds directional differences between the current motion vector fed via the line L10 and the predictor thereof based on a DPCM technique and encodes the differences by using, e.g., VLC technique. The encoded differences are then transmitted to a decoder of a receiving end as an encoded motion vector of the current search block.

By encoding a motion vector of a search block based on a predictor thereof, the amount of data representing the motion vector can be effectively reduced since the difference between the motion vector and the predictor thereof is normally smaller than the motion vector itself in most cases.

In certain case, however, e.g., if reference motion vectors are of a large variation, the conventional predictor determination scheme based on the median filtering described above may not produce an optimum predictor of a motion vector, resulting in a degraded coding efficiency.

SUMMARY OF THE INVENTION

It is, therefore, an object of the invention to provide a method and apparatus capable of determining an optimum predictor of a motion vector thereby improving a coding efficiency of the motion vector.

In accordance with one aspect of the present invention, there is provided a method for encoding a current motion vector CMV of a search block based on a plurality of reference motion vectors RMV's, wherein the reference motion vectors represent motion vectors of reference blocks of the search block and each motion vector includes a first and a second components, the method comprising the steps of:

(a) finding a first candidate predictor FCP having a first and a second components FCP_1 and FCP_2, a FCP_J representing a median of $J_{th}$ components RMV_J's of the RTV's, j being 1 and 2;

(b) calculating an absolute difference J between a $J_{th}$ component CMV_j of the CMV and each of RMV_j's;

(c) determining a second candidate predictor SCP having a first component SCP_1 and a second component SCP_2, a SCP_j representing a RMV_j which yields a least absolute difference J;

(d) computing a dispersion value of the RMV's and comparing the dispersion value with a predetermined threshold to thereby generate a first selection signal if the dispersion value is less than the threshold and a second selection signal if otherwise, the dispersion value indicating whether the RMV's are closely related to each other or not;

(e) providing a third candidate predictor TCP having a first component TCP_1 and a second component TCP_2 based on the number of encoded bits generated by encoding the CMV_j with respect to each of the FCP_j and the SCP_j, wherein a TCP_j is one of the FCP_j and the SCP_j; and (f) encoding the current motion vector CMV based on the first and the third candidate predictor FCP and TCP in response to the first and the second selection signals, respectively, thereby generating encoded motion vector data for the CMV.

In accordance with another aspect of the present invention, there is provided an apparatus for encoding a current motion vector CMV based on a plurality of reference motion vectors RMV's, each of the motion vectors including a first and a second components, comprising:

means for computing a dispersion value of the first and the second components RMV_1's and RMV_2's of the RMV's to thereby issue a first selection signal if the dispersion value is considered to be low and a second selection signal if otherwise;

means for determining a first predictor FCP having a first and a second components FP_1 and FP_2, wherein a FP_j represents a median value of RMV_j's, j being 1 and 2;

means for obtaining a second predictor SP having a first and a second components SP_1 and SP_2, wherein a SP_j corresponds to one of the RMV_j's which yields a minimum difference with respect to a $J_{th}$ component CMV_J of the CMV;

means for evaluating the number of encoded bits generated when encoding the CMV_j with respect to each of the FP_j and the SP_j and to thereby generate a third predictor TP having a first and a second components TP_1 and TP_2, wherein the TP_j represents one of the FP_j and the SP_j, the number of encoded bits corresponding to said one of the FP_j and the SP_j being not greater than the one corresponding to the other one of the FP_j and the SP_j;

means for selecting the FP or the TP as an optimum predictor OP in response to the first or second selection signal; and means for encoding the CMV with respect to the OP to thereby generate encoded motion vector data.

BRIEF DESCRIPTION OF THE DRAWINGS

The above and other objects and features of the present invention will become apparent from the following description of preferred embodiments given in conjunction with the accompanying drawings, in which.

DETAILED DESCRIPTION OF THE PREFERRED EMBODIMENTS

Figure 2:
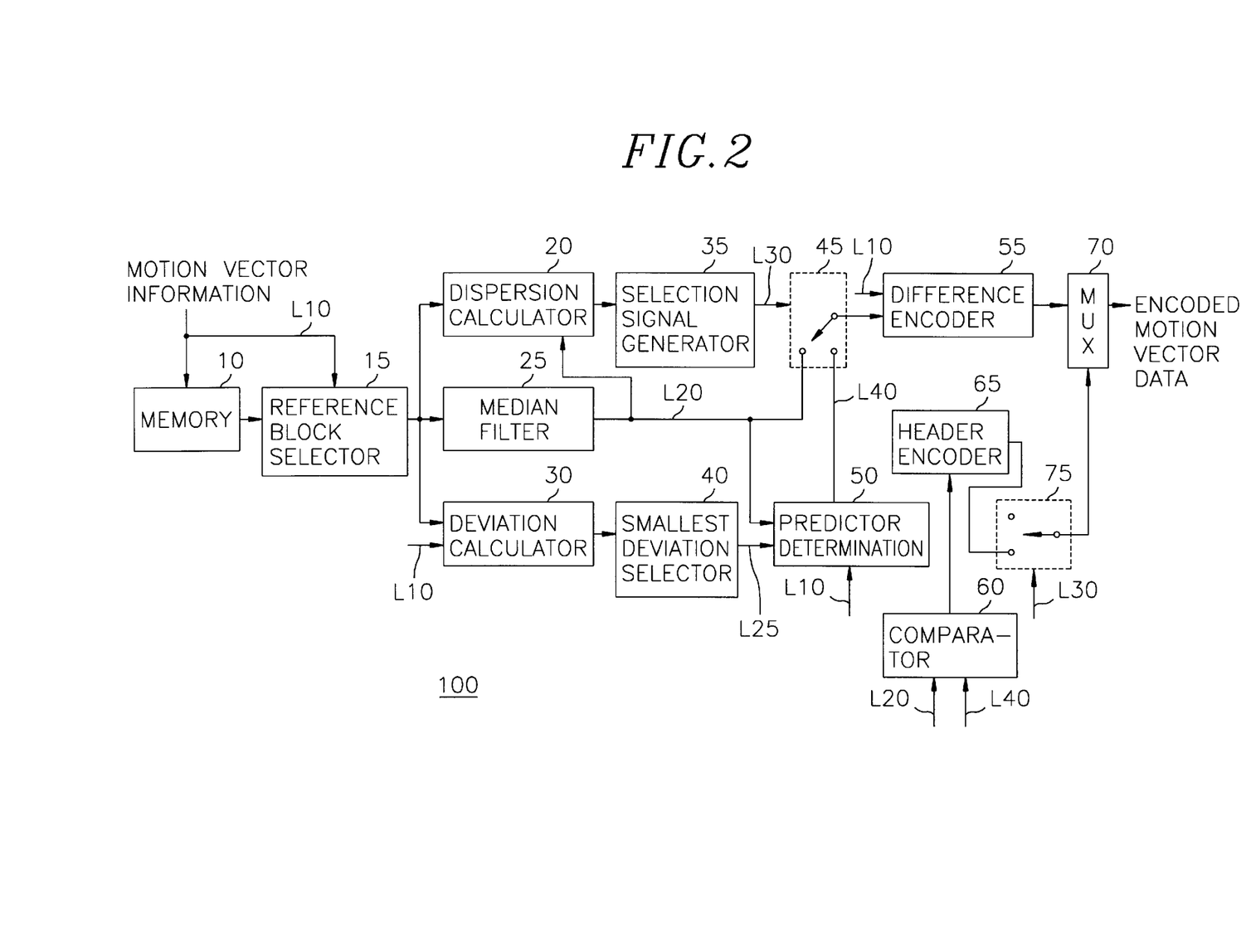
FIG. 2 presents a block diagram of an apparatus 100 for encoding a motion vector of a search block in accordance with the present invention.

Referring to FIG. 2, there is shown a block diagram of an apparatus 100 for encoding a motion vector of a search block in accordance with the present invention, wherein the motion vector represents a displacement between the search block of a current frame and a candidate block within a corresponding search region of a previous frame which yields a minimum error function. Motion vector information for each of the search blocks within a current frame is inputted to a memory 10, a reference block selector 15, a deviation calculator 30, a predictor determination block 50 and a difference encoder 55 via a line L10, wherein the motion vector information represents position data of a current search block and a motion vector thereof, the motion vector being represented by a horizontal and a vertical components thereof.

The memory 10 stores therein the motion vector for each search block by using the position data thereof.

The reference block selector 15 determines reference search blocks of a current search block based on position data thereof and retrieves motion vectors of the reference search blocks from the memory 10. In a preferred embodiment of the invention, three search blocks positioned at the left, the upper and the upper-right of the current search block are selected as the reference search blocks in a same manner as in the MPEG-4 verification model 7.0 described above. In another instance of the invention, another set of search blocks, e.g., at the left, the upper and the upper-left of the current search block can be decided as the reference search blocks. In any cases, it is preferable to set the number of the reference search blocks to be an odd number in order to facilitate the median filtering of the motion vectors thereof.

The motion vectors of the reference search blocks, each comprising horizontal and vertical components, are provided to a dispersion calculator 20, a median filter 25 and the deviation calculator 30 as the reference motion vectors RMV's of the motion vector for the current search block ("current motion vector").

The median filter 25 determines a first candidate predictor of the current motion vector CMV based on the reference motion vectors. A horizontal and a vertical components FCP_x and FCP_y of the first candidate predictor FCP are computed as:

FCP-x=median(RMV(1)-x, RMV(2)-x, . . . , RMV(N)-x)

FCP-y=median(RMV(1)-y, RMV(2)-y, . . . , RMV(N)-y)

wherein RMV(i)_x and RMV(i)_y are horizontal and vertical components of an $i_{th}$ reference motion vector RMV(i), i being 1,2, . . . , N with N being the number of the reference motion vectors of the search block. For instance, if N=3 and RMV(1)=(−2, 3), RMV(2)=(1, 5) and RMV(3)=(−1, 7), then it is determined that FCP_x=−1 and FCP_Y=5. The computed horizontal and vertical components of the first candidate predictor are provided to the dispersion calculator 20, a switch 45, the predictor determination block 50 and a comparator 60 via a line L20.

The dispersion calculator 20 calculates directional dispersions of the reference motion vectors around the first candidate predictor and provides same to a selection signal generator 35. The horizontal and the vertical dispersions DIS_x and DIS_y of the horizontal and the vertical components of the reference motion vectors are calculated as follows, respectively:

$$DIS-x = \frac{1}{N}\sum_{i=1}^{N}(RMV(i)-x-FCP-x)^2$$

$$DIS-y = \frac{1}{N}\sum_{i=1}^{N}(RMV(i)-y-FCP-y)^2$$

The selection signal generator 35 compares the sum of the horizontal and the vertical dispersions DIS_x and DIS_y with a threshold to generate a first or a second selection signal to the switch 45 and a switch 75 via a line L30. If the sum is less than the threshold, the first selection signal is provided and, if otherwise, the second selection signal is provided.

In the meantime, the deviation calculator 30 calculates directional deviations between the respective reference motion vectors fed from the reference block selector 15 and the current motion vector on the line L10. The directional differences may be defined as:

DIR-DIF(i)-x=|RMV(i)-x−CMV-x|

DIR-DIF(i)-y=|RMV(i)-y−CMV-y| wherein DIR_DIF(i)_x and DIR_DIF(i)_y represent a horizontal and a vertical deviations for the reference motion vector RMV(i), respectively; and CMV_x and CMV_y denote the horizontal and the vertical components of the current motion vector CMV, respectively. Provided from the deviation calculator 30 to a smallest deviation selector 40 is a set of deviation data (RMV(i)_x, DIR_DIF(i)_x) and (RMV(i)_y, DIR_DIF(i)_y) for the reference motion vector RMV(i).

In response to the sets of deviation data from the deviation calculator 30, the smallest deviation selector 40 determines a smallest horizontal and vertical deviations among DIR_DIF(i)_x's and DIR_DIF(i)_y's, respectively; and provides the predictor determination block 50 with a second candidate predictor SCP of the current motion vector via a line L25, wherein the second candidate predictor SCP is composed of a horizontal and a vertical components SCP_x and SCP_y, the horizontal component SCP_x being a horizontal component of a reference motion vector which generates the smallest horizontal deviation and the vertical component SCP_y representing a vertical component of a reference motion vector which yields the smallest vertical deviation. For instance, if N=3 and RMV(1)=(−2, 3), RMV(2)=(1, 5), RMV(3)=(−1, 7) and the current motion vector CMV=(5, 1), then the second candidate predictor SCP is determined to be (1, 3).

The predictor determination block 50 determines a third candidate predictor TCP based on the first and the second candidate predictors FCP and SCP fed on the lines L20 and L25 and the current motion vector CMV on the line L10.

Figure 3:
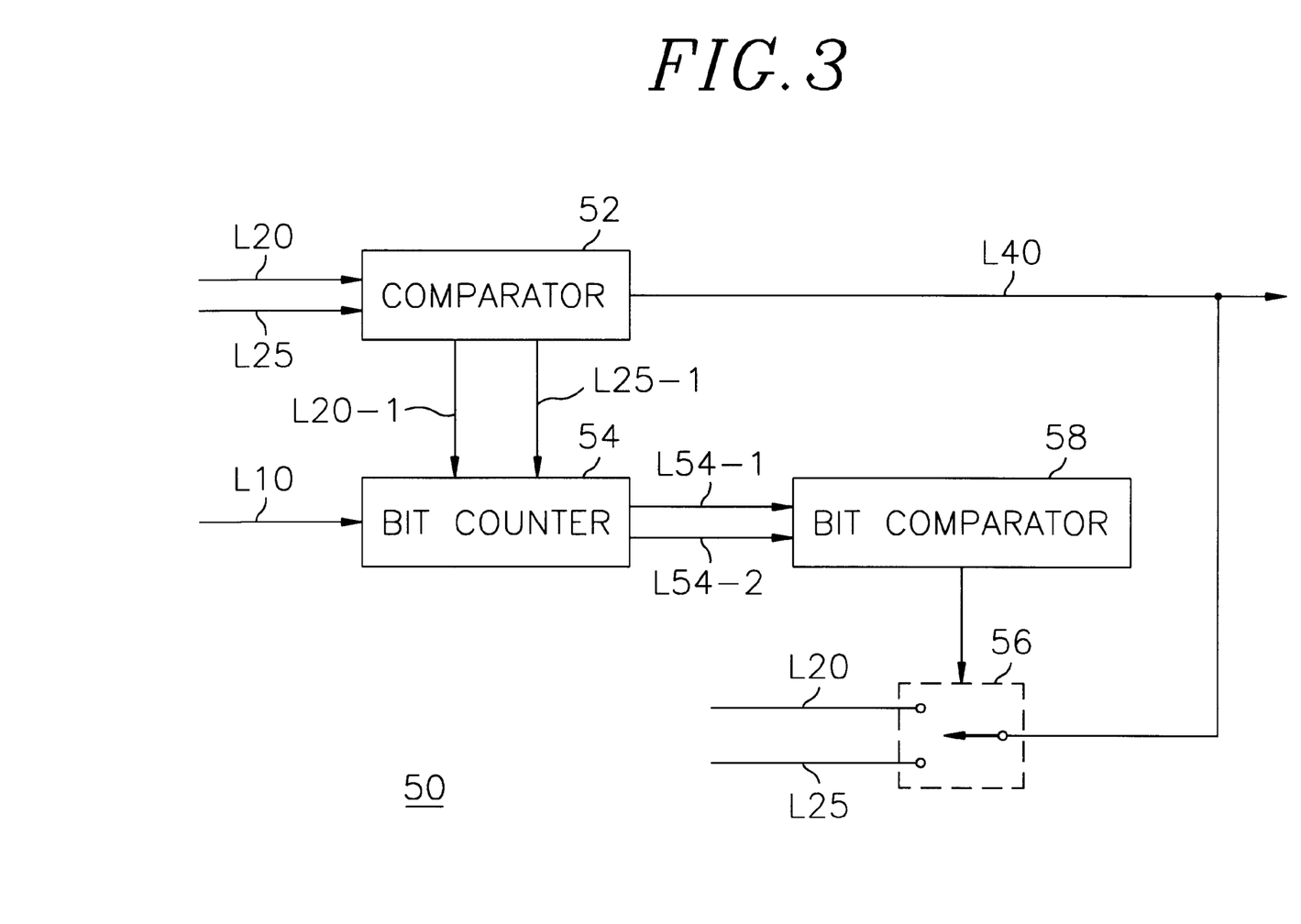
FIG. 3 provides a block diagram of a predictor determination block 50 shown in FIG. 2.

Referring to FIG. 3, there is illustrated a detailed block diagram of the predictor determination block 50, which includes a comparator 52, a bit counter 54, a bit comparator 58 and a switch 56.

At the comparator 52, the horizontal and the vertical components of the first candidate predictor FCP on the line L20 are respectively compared with the horizontal and the vertical components of the second candidate predictor SCP on the line L25. If the horizontal component of the first candidate predictor FCP_x is equal to the horizontal component of the second candidate predictor SCP_x, either the FCP_x or the SCP_x is provided on a line L40 as a horizontal component TCP_x of the third candidate predictor TCP. If, however, the FCP_x and the SCP_x are not identical to each other, the FCP_x and the SCP_x are fed to the bit counter 54 via lines L20-1 and L25-1, respectively.

In response to the FCP_x and the SCP_x from the comparator 52 and the horizontal component of the current motion vector CMV_x on the line L10, the bit counter 54 calculates the number of encoded bits BIT_DIF_FC_x corresponding to the difference between the FCP_x and the CMV_x and the one BIT_DIF_SC_x for the difference between the SCP_x and the CMV_x to thereby provide the BIT_DIF_FC_x and the BIT_DIF_SC_x to the bit comparator 58 via lines L54-1 and L54-2. The bit comparator 58 compares the BIT_DIF_FC_x with the BIT_DIF_SC_x; and provides the switch 56 with a first switch control signal FIR_SW_x if the BIT_DIF_FC_x is equal to or smaller than the BIT_DIF_SC_x or a second switch control signal SEC_SW_y if otherwise.

At the switch 56, the FCP_x on the line L20 is selected if the FIR_SW_x is inputted thereto or the SCP_x on the line L25 in response to the SEC_SW_x. The selected component the FCP_x or the SCP_x is then provided on the line L40 as the horizontal component TCP_x of the third candidate predictor TCP.

The determination of a vertical component TCP_y of the third candidate predictor TCP is carried out in an identical manner as for the TCP_x. That is, if the FCP_y is identical to the SCP_y, either the FCP_y or the SCP_y is fed on the line L40 as a vertical component TCP_y of the third candidate predictor TCP; and if otherwise, both the FCP_y and the SCP_y are provided to the bit counter 54. Thereafter, as in an identical manner for the horizontal components, the bit counter 54 calculates the number of encoded bits BIT_DIF_FC_y for the difference between the FCP_y and the CMV_v and the one BIT_DIF_SC_y for the difference between the SCP_y and the CMV_y, thereby providing the BIT_DIF_FC_y and the BIT_DIF_SC_y to the bit comparator 58.

The bit comparator 58 provides the switch 56 with a first switch control signal FIR_SW_y or a second switch control signal SEC_SW_y based on identical criterion employed in generating the FIR_SW_x and the SEC_SW_x. The switch 56 then provides the FCP_y or the SCP_y on the line L40 as the vertical component TCP_y of the third candidate predictor TCP.

Figure 4:
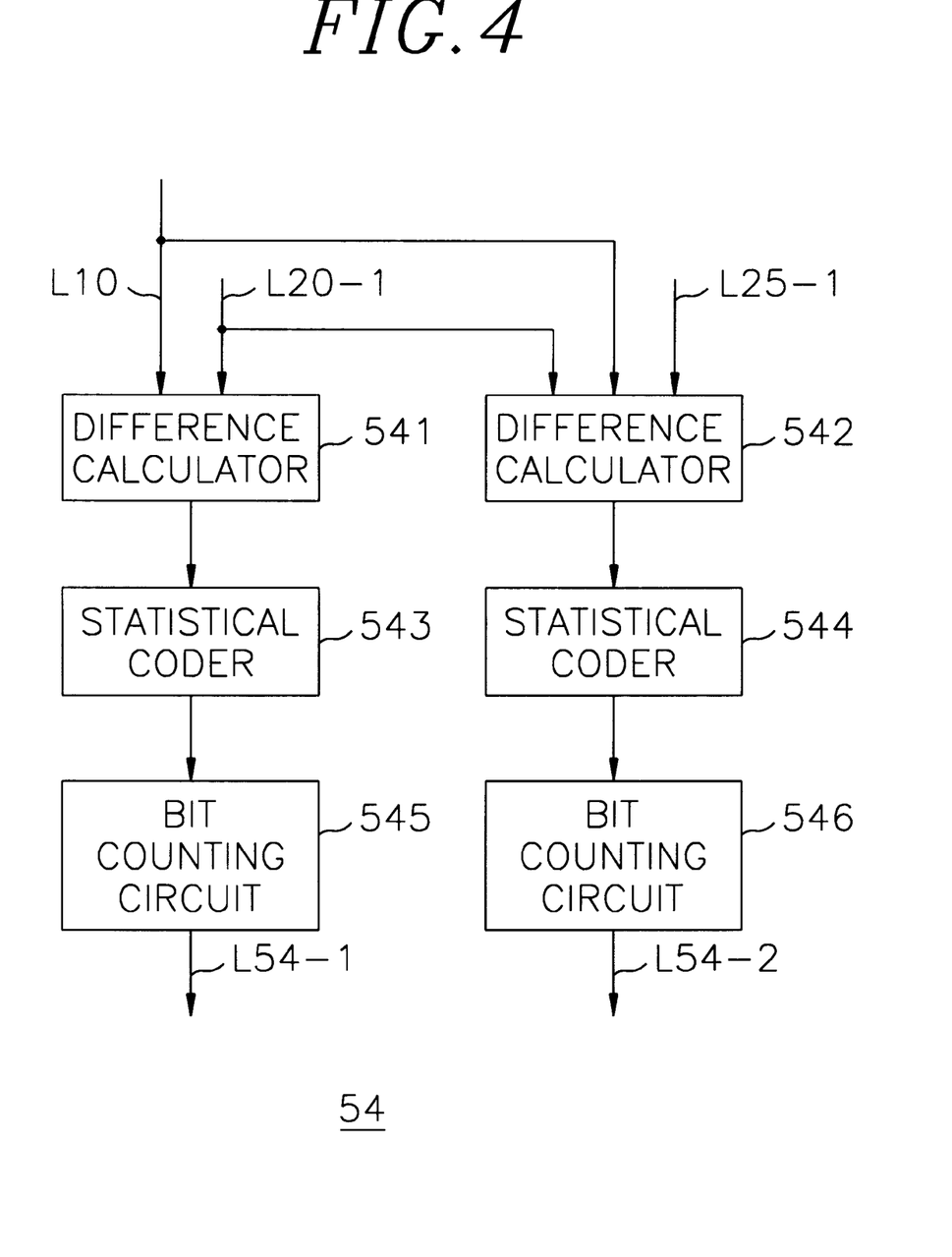
FIG. 4 depicts a detailed block diagram of a bit counter 54 shown in FIG. 3.

Referring to FIG. 4, there is illustrated a detailed block diagram of the bit counter 54 shown in FIG. 3. The bit counter 54 includes a first set of a difference calculator 541, a statistical coder 543 and a bit counting circuit 545 for calculating the number of encoded bits related to the first candidate predictor FCP and a second set of difference calculator 542, a statistical coder 544 and a bit counting circuit 546 for obtaining the number of encoded bits for the second candidate predictor SCP.

As described with respect to the bit counter 54 shown in FIG. 3, the line L10 is coupled to the bit counter 54 regardless of the comparison result at the comparator 52; and a set of FCP__x and SCP__x and a set of FCP__y and SCP__y are applied to the bit counter 54 via the lines L20-1 and L25-1 when the FCP__x and FCP__y are identical to the SCP__x and the SCP__y, respectively. Therefore, if the FCP__x or the FCP__y is inputted via the line L20-1, the SCP__x or the SCP__y is provided on the line L25-1 simultaneously. Coupled to the difference calculator 541 are the lines L10 and the L20-1 whereas the three lines L10, L20-1 and L25-1 are all coupled to the difference calculator 542.

In response to the FCP__x(or FCP__y) on the line L20-1, the difference calculator 541 calculates the difference or the offset between the FCP__x(or FCP__y) and the CMV__x(or CMV__y) by, e.g., subtracting the latter from the former as in the conventional DPCM scheme; and provides same to the statistical coder 543.

At the statistical coder 543, the offset is statistically coded by using the conventional VLC technique to provide a codeword of the offset. Further, also generated at the statistical coder 543 is a statistically coded flag signal representing that the offset is calculated with respect to the FCP__x(or FCP__y), which is the median value of the horizontal(or the vertical) components of the reference motion vectors RMV's of the current motion vector CMV. The statistical coder 543 provides the codeword of offset and the flag signal to the bit count circuit 545 as the encoded bits of the CMV__x(or CMV__y). The bit counting circuit 545 then counts the number of encoded bits of the CMV__x(or CMV__y) and provides same on the line L54-1 as the BIT__DIF__FC__x(or y).

In the meantime, the difference calculator 542, responsive to the FCP__x(or FCP__y) on the line L20-1 and the SCP__x(or SCP__y) on the line L25-1, calculates the difference or the offset between the SCP__x(or SCP__y) and the CMV__x(or CMV__Y) on the line L10 in an identical manner as in the difference calculator 541; further, in contrast to the difference calculator 541, an identification signal, denoting whether the SCP__x(or SCP__y) is smaller or greater than the FCP__x(or FCP__y), is also obtained at the difference calculator 542 by comparing the former with the latter.

In the preferred embodiment of the invention, since the number of reference motion vectors or the reference search blocks is assumed to be three and a decoder at a receiving end has information on the reference motion vectors, the identification signal can provide to the decoder sufficient information identifying a reference motion vector or a reference search block corresponding to the SCP__x(or the SCP__y). If the number of reference search blocks is greater than 3, a reference search block corresponding to the SCP__x(or SCP__y) can be identified by appending indices of the reference search blocks to their corresponding reference motion vectors in the stage of calculating the deviations at the deviation calculator 30 shown in FIG. 2. In such an instance, the identification signal represents an index of the reference search block corresponding to the SCP__x(or SCP__y).

The offset and the identification signal are provided from the difference calculator 542 to the statistical coder 544 and statistically coded therein in a same manner as in the statistical coder 543 to thereby provide a codeword of the offset and a statistically coded identification signal to the bit count circuit 546 as encoded bits for the CMV__x(or CMV__y). At the bit count circuit 546, the number of encoded bits for the CMV__x(or CMV__y) is provided on the line L54-2 as the BIT__DIF__SC__x(or y).

Referring back to FIG. 2, the switch 45 selects either the first candidate predictor FCP on the line L20 in response to the first selection signal on the line L30 or the third candidate predictor TCP on the line L40 in response to the second selection signal on the line L30 and provides same to the difference encoder 55 as an optimum predictor OP for the current motion vector.

Meanwhile, the comparator 60 respectively compares the FCP__x and the FCP__y on the line L20 with the TCP__x and the TCP__y on the line L40 and provides a horizontal and a vertical comparison results to a header encoder 65. The header encoder 65 generates a flag or an identification signal for each comparison result. For instance, if the FCP__x is equal to the TCP__x, the flag signal '0' is generated; if smaller, '10'; and if greater, '11'. Similarly, if the FCP__y is equal to the TCP__y, the flag signal '0' is generated; if smaller, '10'; and if greater, '11'. For the instance given above, i.e., the first candidate predictor FCP=(−1, 5) and if the third candidate predictor TCP is determined as (−1, 3), flag signals '0' and '11' are generated for the horizontal and the vertical components TCP__x and TCP__y of the TCP, respectively.

A pair of flag signals for the TCP is fed to the switch 75. Encoding of the flag signals at the header encoder 65 is carried out based on the VLC technique identical to the one employed in the statistical coder 543 and 544.

The difference encoder 55 calculates, in an identical manner as in the difference calculator 541 shown in FIG. 4, the differences between the horizontal component CMV__x of the current motion vector CMV and the horizontal component OP__x of the optimum predictor OP and between the vertical component CMV__y of the current motion vector CMV and the vertical component OP__y of the optimum predictor OP, and encodes the differences based on, e.g., the VLC technique by using an identical lookup table employed at the statistical coders 543 and 544. The encoded differences are provided to a multiplexor(MUX) 70 as a coded motion vector for the current search block.

The switch 75 provides the set of flag signals fed from the header encoder 65 to the MUX 70 if and only if the second selection signal is inputted thereto via the line L30. At the MUX 70, the coded motion vector fed from the difference encoder 55 and the set of flag signals, if provided from the switch 75, are multiplexed as encoded motion vector data for the current search block and transmitted to a transmitter(not shown) for the transmission thereof.

At the decoder of the receiving end, the sum of the directional dispersions of the reference motion vectors are calculated in an identical manner as in the dispersion calculator 20. If the sum is less than the threshold, the motion vector of the current search block is reconstructed based on the median vector, i.e., the first candidate predictor FCP, of the reference motion vectors and the transmitted encoded motion vector data. If the sum is not less than the threshold, the motion vector of the current search block can be reconstructed based on the flag signals and the coded motion vector data included in the encoded motion vector data.

While the present invention has been described with respect to the particular embodiments, it will be apparent to those skilled in the art that various changes and modifications may be made without departing from the spirit and scope of the invention as defined in the following claims.

What is claimed is:

1. A method for encoding a current motion vector CMV of a search block based on a plurality of reference motion vectors RMV's, wherein the reference motion vectors represent motion vectors of reference blocks of the search block and each motion vector includes a first and a second components, the method comprising the steps of:

(a) finding a first candidate predictor FCP having a first and a second components FCP_1 and FCP_2, a FCP_j representing a median of $j_{th}$ components RMV_j's of the RMV's, j being 1 and 2;

(b) calculating an absolute difference j between a $j_{th}$ component CMV_j of the CMV and each of RMV_j's;

(c) determining a second candidate predictor SCP having a first component SCP_1 and a second component SCP_2, a SCP_j representing a RMV_j which yields a least absolute difference j;

(d) computing a dispersion value of the RMV's and comparing the dispersion value with a predetermined threshold to thereby generate a first selection signal if the dispersion value is less than the threshold and a second selection signal if otherwise, the dispersion value indicating whether the RMV's are closely related to each other or not;

(e) providing a third candidate predictor TCP having a first component TCP_1 and a second component TCP_2 based on the number of encoded bits generated by encoding the CMV_j with respect to each of the FCP_j and the SCP_j, wherein a TCP_j is one of the FCP_j and the SCP_j; and (f) encoding the current motion vector CMV based on the first and the third candidate predictor FCP and TCP in response to the first and the second selection signals, respectively, thereby generating encoded motion vector data for the CMV.

2. The method according to claim 1, wherein the dispersion value is defined as:

$$DIS = \frac{1}{N}\sum_{i=1}^{N}(RMV(i)\_1 - FCP\_1)^2 + \frac{1}{N}\sum_{i=1}^{N}(RMV(i)\_2 - FCP\_2)^2$$

wherein DIS represents the dispersion value; and RMV(i)_1 and RMV(i)_2 denote a first and a second components of an $i_{th}$ reference motion vector RMV(i), respectively, i being 1 to N with N being the number of the reference motion vectors.

3. The method according to claim 2, wherein the providing step (e) includes the steps of:

(e1) comparing the FCP_j with the SCP_j;

(e2) if the FCP_j and the SCP_j are identical, selecting either the FCP_j or the SCP_j as the TCP_j;

(e3) if the FCP_j and the SCP_j are not identical, encoding the CMV_j with respect to the FCP_j and the SCP_j to thereby generate first and second encoded data, respectively, and the number of bits of each of the first and the second encoded data;

(e4) comparing the number of bits of the first encoded data with the one of the second encoded data; and (e5) choosing the FCP_j as the TCP_j if the number of encoded bits of the first encoded data is smaller than the one of the second encoded data and choosing the SCP_j as the TCP_j if otherwise.

4. The method according to claim 3, wherein the step (e3) has the steps of:

(e31) if the FCP_j and the SCP_j are not identical, calculating the difference between the CMV_j and the FCP_j;

(e32) encoding the difference in step (e31) based on a predetermined statistical coding technique and providing a statistically coded flag signal representing the FCP_j to thereby generate the first encoded data; and (e33) counting the number of bits of the first encoded data.

5. The method according to claim 4, wherein the step (e3) further has the steps of:

(e34) calculating the difference between the CMV_j and the SCP_j;

(e35) encoding the difference in step (e34) based on the predetermined statistical coding technique and providing a statistically coded identification signal representing a reference block corresponding to the SCP_j to thereby generate the second coded data; and (e36) counting the number of bits of the second encoded data.

6. The method according to claim 5, wherein the encoding step (f) includes the steps of:

(f1) generating, based on the predetermined statistical coding technique, a first and a second flag signals representing reference blocks corresponding to the TCP_1 and the TCP_2, respectively;

(f2) selecting, as an optimum predictor OP of the CMV, the FCP or the TCP in response to the first or the second selection signal, the OP having a first component OP_1 and a second component OP_2;

(f3) encoding the CMV with respect to the optimum predictor OP to thereby generate coded motion vector data for the CMV; and (f4) generating, as the encoded motion vector data, the coded motion vector data in response to the first selection signal or the coded motion vector data together with the first and the second flag signals in response to the second selection signal.

7. The method according to claim 6, wherein N=3.

8. The method according to claim 7, wherein the generating step (f1) has steps of:

(f11) comparing the FCP_1 and the FCP_2 with the TCP_1 and the TCP_2, respectively;

(f12) generating the first and the second flag signals based on the comparison results obtained in step (f11).

9. The method according to claim 8, wherein the first and the second flag signals represent whether the TCP_1 and the TCP_2 are smaller than, equal to, or greater than the FCP_1 and the FCP_2, respectively.

10. The method according to claim 9, wherein the encoding step (f3) has the steps of:

(f31) calculating a first difference between the CMV_1 and the OP_1 and a second difference between the CMV_2 and the OP_2; and (f32) encoding the first and the second differences in step (f31) based on the predetermined statistical coding technique to thereby generate the coded motion vector data.

11. The method according to claim 10, wherein the predetermined statistical coding technique is a variable length coding technique.

12. An apparatus for encoding a current motion vector CMV based on a plurality of reference motion vectors RMV's, each of the motion vectors including a first and a second components, comprising:

means for computing a dispersion value of the first and the second components RMV_1's and RMV_2's of the RMV's to thereby issue a first selection signal if the dispersion value is considered to be low and a second selection signal if otherwise;

means for determining a first predictor FCP having a first and a second components FP_1 and FP_2, wherein a FP_j represents a median value of RMV_j's, j being 1 and 2;

means for obtaining a second predictor SP having a first and a second components SP_1 and SP_2, wherein a SP_j corresponds to one of the RMV_j's which yields a minimum difference with respect to a $j_{th}$ component CMV_j of the CMV;

means for evaluating the number of encoded bits generated when encoding the CMV_j with respect to each of the FP_j and the SP_j and to thereby generate a third predictor TP having a first and a second components TP_1 and TP_2, wherein the TP_j represents one of the FP_j and the SP_j, the number of encoded bits corresponding to said one of the FP_j and the SP_j being not greater than the one corresponding to the other one of the FP_j and the SP_j;

means for selecting the FP or the TP as an optimum predictor OP in response to the first or second selection signal; and means for encoding the CMV with respect to the OP to thereby generate encoded motion vector data.

13. The apparatus according to claim 12, wherein said computing means include means for computing the dispersion value defined as:

$$DIS = \frac{1}{N}\sum_{i=1}^{N}(RMV(i)-1-FP-1)^2 + \frac{1}{N}\sum_{i=1}^{N}(RMV(i)-2-FP-2)^2$$

wherein DIS represents the dispersion value; and RMV(i)_1 and RMV(i)_2 denote RMV_1 and a RMV_2 of an $i_{th}$ reference motion vector RMV(i), respectively, i being 1 to N with N being the number of the RMV's.

14. The apparatus according to claim 13, wherein said evaluating means includes:

means for comparing the FP_j and with the SP_j, to thereby generate either FP_j or the SP_j as the TP_j if the FP_j is equal to the SP_j and generate both the FP_j and the SP_j if otherwise;

means, in response to the FP_j and the SP_j from said comparing means and the CMV_j, for obtaining the number of encoded bits generated when encoding the CMV_j with respect to each of the FP_j and the SP_j; and means for choosing one of the FP_j and the SP_j as the TP_j, the number of encoded bits corresponding to the chosen one of the FP_j and the SP_j being not greater than the one corresponding to the unchosen one.

15. The apparatus according to claim 14, wherein said means for obtaining the number of encoded bits includes:

a first bit counting means, responsive to the CMV_j and the FP_j, for providing the first number of encoded bits corresponding to FP_j; and a second bit counting means, responsive to the CMV_j, the FP_j and the SP_j, for calculating the second number of encoded bits corresponding to SP_j.

16. The apparatus according to claim 15, wherein said first bit counting means includes:

means for computing a first difference between the CMV_j and the FP_j;

means for encoding the first difference based on a predetermined statistical coding technique and providing a statistically coded flag signal representing the FP_j to thereby generate first encoded data; and means for counting the number of bits of the first encoded data to thereby generate the first number of encoded bits.

17. The apparatus according to claim 16, wherein N=3.

18. The apparatus according to claim 17, wherein said second bits counting means includes:

means for computing a second difference between the CMV_j and the SP_j and providing an identification signal by comparing the FP_j with the SP_j to thereby generate second encoded data, the identification signal representing whether the SP_j is greater or smaller than the FP_j; and means for counting the number of bits of the second encoded data to thereby generate the second number of encoded bits.

19. The apparatus according to claim 18, wherein said choosing means includes:

means for comparing the first number of encoded bits with the second number of encoded bits to thereby generate a switch control signal representing whether the first number of encoded bits is smaller than the second number of encoded bits or not; and means for selecting, as the TP_j, the FP_j if the switch control signal represents that the first number of encoded bits is smaller than the second number of encoded bits, and the SP_j if otherwise.

20. The apparatus according to claim 19, wherein said encoded motion vector data further includes a flag signal representing whether the TP_j is smaller than, equal to, or greater than the FP_j in case the TP is selected as the OP.

* * * * *